Figure 1:
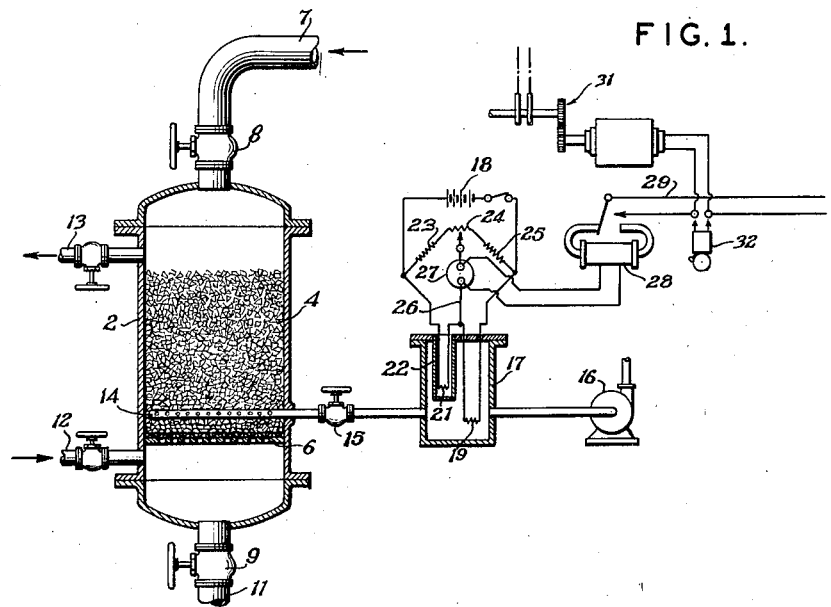

Aug. 13, 1940.  A. B. RAY ET AL  2,211,162

SOLVENT RECOVERY SYSTEM

Filed Feb. 5, 1938

INVENTORS
ARTHUR B. RAY
LEONARD A. LOGAN
BY
ATTORNEY

Patented Aug. 13, 1940

2,211,162

UNITED STATES PATENT OFFICE 2,211,162

SOLVENT RECOVERY SYSTEM

Arthur B. Ray, Port Washington, and Leonard A. Logan, Flushing, N. Y., assignor to Carbide and Carbon Chemicals Corporation, a corporation of New York Application February 5, 1938, Serial No. 188,946

1 Claim. (Cl. 23—232)

The invention relates to recovery systems, and is particularly concerned with an improved process for controlling the operation of a system in which solvent vapors are recovered from air by adsorption in a solid adsorbent, such as activated carbon.

In many industrial processes, mixtures are produced which contain air and volatile solvent materials. The recovery of such solvents for reuse is ordinarily an economic and sanitary necessity. Recovery may be effected in a satisfactory manner by the use of a solid adsorbent, such as activated carbon. The usual adsorption system of this type comprises one or more adsorbers containing the adsorbent, arranged so that vapor-laden air to be treated travels through a bed of the adsorbent, whereby the solvent vapors are adsorbed, the denuded air being exhausted to the atmosphere. When the adsorbent has become substantially saturated with solvent, the influx of vapor-laden air is terminated, and the adsorbed material is driven off by heating, as by passing steam directly in contact with the adsorbent bed. The solvent is then recovered by passing the effluent steam and vapor mixture into suitable condensing and/or rectifying apparatus. A complete cycle on a single adsorber comprises an adsorption period, a steaming period, and usually a cooling interval prior to returning the adsorber to adsorption service. Adsorber operation and cycle control can be effected manually or by means of automatic equipment.

The present invention is concerned with this general type of adsorption system, and has for its principal object to provide an improved operation for controlling and terminating the adsorption period of an adsorber, so that the adsorptive capacity can be fully utilized in each cycle without loss of solvent vapor in the exhaust air.

The invention embraces a detecting device adapted to indicate the presence of solvent vapors in mixture with air. During the adsorption cycle air is withdrawn, continuously or intermittently, from the system and passed through the detector referred to above, which, upon registering a predetermined solvent content in the air, determines or controls the end of the adsorption period. The point in the system at which the air sample is withdrawn is of importance to the efficiency of the process, and this is chosen with consideration to the amount of solvent vapor necessary to insure proper and accurate function of the detector instrument, and the fact that the adsorbent should approach saturation as closely as is possible without risking loss of solvent in the exhaust air. As applied to a single adsorber, the detector air sample is preferably taken directly from the adsorbent mass near the exhaust side of the adsorbent bed. Where two or more adsorbers are operated in series, the detector can be operatively connected to the gas flow conduit between two adsorbers or to the second adsorber. In either case sampling is effected prior to complete passage of fluid through the adsorbent.

The detector apparatus may be operatively connected with a sound or light signal, and the adsorption cycle terminated manually with such warning, or through other means the detector may function automatically to stop fluid flow when the adsorbent approaches saturation. Since a majority of solvent materials are of inflammable nature, a combustible gas detector, of which there are many known, is well adapted for the purpose of this invention. Among these the so-called heated filament type operating on the principle of the Wheatstone bridge is especially suitable, and will be further described in a preferred embodiment of the invention.

Figure 2:
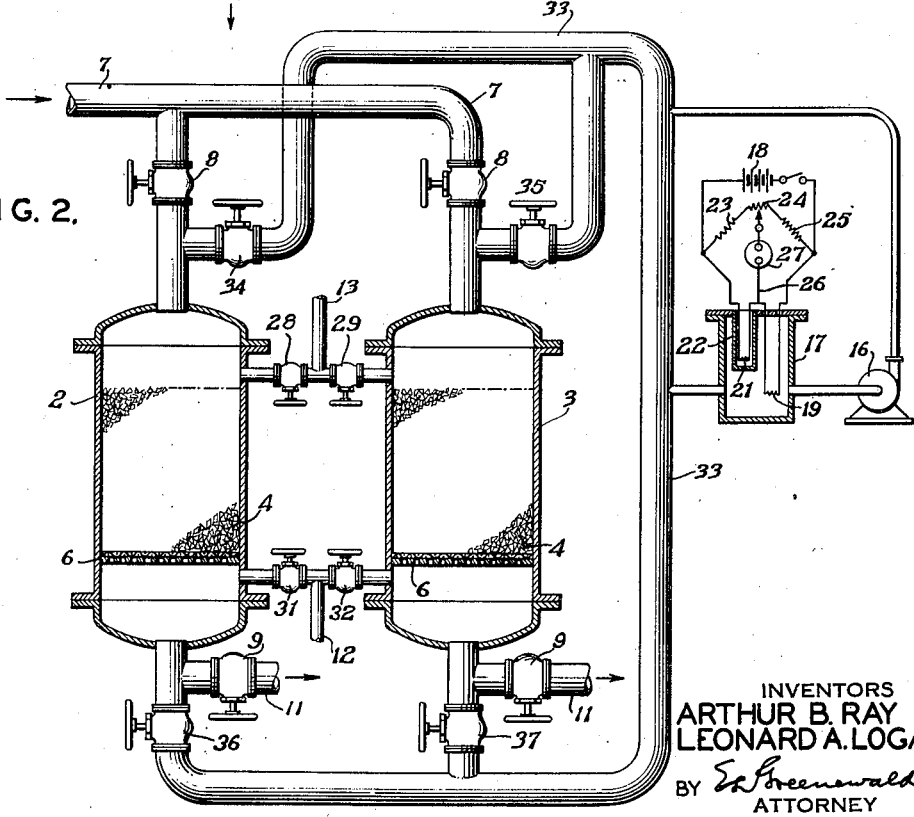

Further details of the invention and its advantages will be evident from the accompanying drawing showing diagrammatically certain embodiments thereof. In the drawing:

Figure 1 represents a suitable detector control applicable for use with a single adsorber; and Figure 2 shows the same detector device in association with a plurality of adsorbers.

With reference to Figure 1, a cylindrical adsorber 2 carries a bed of solid adsorbent 4 supported therein on a suitable foraminous support plate 6. Vapor-laden air from which the solvent is to be recovered enters the adsorber through inlet conduit 7 and the valve 8, and passes into and through the adsorbent bed 4, the denuded air being withdrawn and exhausted to the atmosphere through the outlet valve 9 and associated conduit 11. Means for steaming the carbon to remove adsorbed vapors is provided by the steam inlet 12 and an outlet 13 which carries the steam and solvent vapor mixture to suitable rectifying apparatus. Extending into and across the adsorbent bed 4, a few inches from the bottom of the bed, there is placed a perforated tube 14, which in connection with the valve 15, and the blower 16, is adapted to withdraw a gas sample as desired directly from the adsorbent bed. Preferably a small volume of gas is withdrawn through the tube 14 continuously during the adsorption cycle. This sample, consisting of denuded air until the portion of the adsorbent bed above the tube 14 has approached its saturation point, when solvent vapor appears in the mixture, passes through the inflammable gas detector 17.

The detector 17 may be of a known structure adapted to register the presence in air of inflammable or combustible gases. As shown it is one of the heated filament type operable on the principle of a Wheatstone bridge. The battery 18 supplies a substantially constant voltage to the detector circuit and heats the filaments 19 and 21 composed of fine platinum wire. The filment 19 is exposed to direct contact with the gas sample withdrawn from the absorber, but the filament 21 is protected therefrom by means of the metal shield 22. Thus while both filaments are subject to the same temperature changes in the gas being tested, the exposed one 19 will increase in temperature, and also resistance, with the inflammable vapor content of the gas sample. This resistance change unbalances the circuit, which also includes the fixed resistances 23, 24 and 25, causing a current to flow through the bridge 26 containing the millivolt meter 27. The meter 27 can be calibrated to register directly the solvent vapor content of the test sample, and the end of the adsorption period is determined when the meter shows a predetermined solvent concentration. In place of the meter 27, or in connection therewith, there may be employed a relay 28, which is operative upon the desired current flow across the bridge 26 to close a further circuit 29, the latter containing a motor operated cycle controller 31, or a sound or light signal as represented at 32. The cycle controller provides an entirely automatic shut-off of vapor-laden air flow into the charged adsorber, and a warning signal is suitable in a manually controlled adsorber system. The predetermined solvent concentration in the gas sample, selected as determining the proper shut-off point, will vary with the position of the sampling tube 14 in the adsorbent bed, but these two factors can be readily correlated to provide at the end of the adsorption period substantial saturation of the entire carbon bed without escape of solvent vapor to the adsorber exhaust.

In Figure 2 the same type of inflammable gas detector is used, and corresponding parts are represented by the same reference numerals. The gas sample withdrawn to the detector is, however, in this modification taken from a different point in the adsorption system, and the adsorbers 2 and 3 are arranged so as to permit a series gas flow from one adsorber to the other over certain portions of the adsorption cycle. Each adsorber has a vapor-laden air inlet and an exhaust for the stripped air similar to Figure 1, as shown respectively by the parts 7, 8, 9 and 11. The steam inlet 12 and the outlet 13 for the steam solvent vapor mixture are also similar, but by means of the valves 28, 29, 31 and 32 these particular connections are made common to both adsorbers. The conduit 33 provides the series flow connection between the adsorbers, and through the valves 34 and 35 at the air inlet ends of the adsorbers, and valves 36 and 37 at the exhaust ends thereof, gas flow through the adsorbers can be controlled in the direction desired.

As an example of the operation of this system the vapor-laden air to be treated is first introduced into adsorber 2 through valve 8, and the stripped air is exhausted directly from this adsorber through valve 9. After a certain period of adsorption, but well prior to the saturation point of the adsorbent, the valve 9 is closed and the air from adsorber 2 is led through the valve 36, the conduit 33 and valve 35 to adsorber 3. After passing through the adsorbent of adsorber 3, air exhaust to the atmosphere is then made through valve 9 of this adsorber. As soon as series flow is established between the two adsorbers, the blower 16 is put into operation, and continuously withdraws a gas sample from the conduit 33 through the detector 17. The detector again functions as previously described, and as shown in Figure 1, and upon registering a predetermined solvent vapor content in the gas flow between adsorbers, determines the end of the adsorption period on adsorber 2. This particular arrangement of the detector, and position of gas sampling for test, is especially suitable for use with systems employing a group of adsorbers, and requires only one detector for every two adsorbers.

Practical tests and commercial operation of the control means of this invention have shown excellent efficiency, and a recovery of as high as 99.8% of the solvent entering the adsorber in mixture with air has been obtained. In many applications where solvent recovery is desirable the solvent vapor rate as passed to the adsorber may vary considerably, which in turn requires variation in the length of the adsorption period. For such purposes the present control means is admirably adapted, and shows far superior results over prior systems employing a set time cycle control. By always continuing the adsorption cycle until substantial saturation of all adsorbent is reached, the steam and condensing water used in the system, per pound of solvent recovered, can be maintained approximately constant regardless of the recovery rate. This contributes to an economy of operation quite impossible with prior recovery systems.

Many modifications in the specific embodiments shown will be evident to those skilled in the art. The position in the adsorber system at which the gas sample is taken, while of importance to the proper control function, can be readily arranged to suit any particular type of adsorbent support structure, or various arrangements of a plurality of adsorbers. The invention should not be limited other than as defined in the appended claim.

We claim:

In the process of recovering inflammable solvent from a gaseous mixture consisting essentially of an adsorbable inflammable solvent vapor component and a non-adsorbable gas component involving the steps of passing the mixture, in one direction, through a first of a series of beds of solid adsorbent such as activated carbon, whereby solvent vapor is adsorbed and separated from said gas, thereafter passing the gaseous effluent from said first bed through the second bed of the series, continuing the serial passage through said first and second beds until said first bed is substantially saturated with adsorbed solvent, by-passing said first bed and passing said mixture through said second bed, removing adsorbed solvent from said first bed by passage therethrough of a suitable stripping fluid such as steam and reactivating the solid adsorbent thereon for reuse, passing effluent gas from said second bed serially through the next bed of the series, and continuing the serial use of the beds cyclically, the improved operation which consists essentially in continuously abstracting a sampling stream from the effluent gas as the latter passes from said first bed to said second bed, continuously analyzing said sampling stream for presence of adsorbable inflammable solvent vapor therein by passing said stream over a heated filament of an inflammable gas detector, continuing the adsorption cycle using said first bed until analysis by said detector indicates that substantial saturation has been attained in said first bed, and automatically terminating passage of gaseous mixture to said first bed in response to such analysis.

ARTHUR B. RAY,
LEONARD A. LOGAN.

CERTIFICATE OF CORRECTION.

Patent No. 2,211,162.　　　　　　　　　　　　　August 13, 1940.

ARTHUR B. RAY, ET AL.

It is hereby certified that error appears in the printed specification of the above numbered patent requiring correction as follows: Page 2, second column, line 71, in the claim, for the word "strippling" read --stripping--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.